March 16, 1937.   G. M. PESTARINI   2,074,236
DYNAMO-ELECTRIC GENERATING APPARATUS
Filed March 2, 1934   2 Sheets-Sheet 1
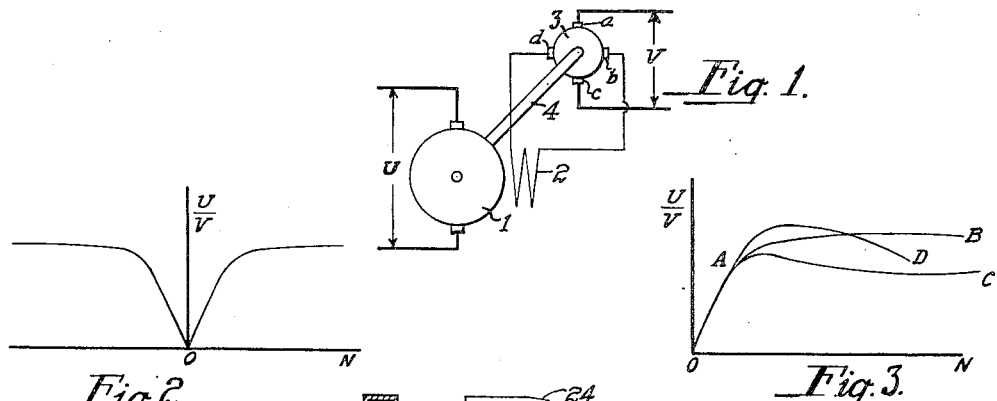
Fig. 1.
Fig. 2.
Fig. 3.
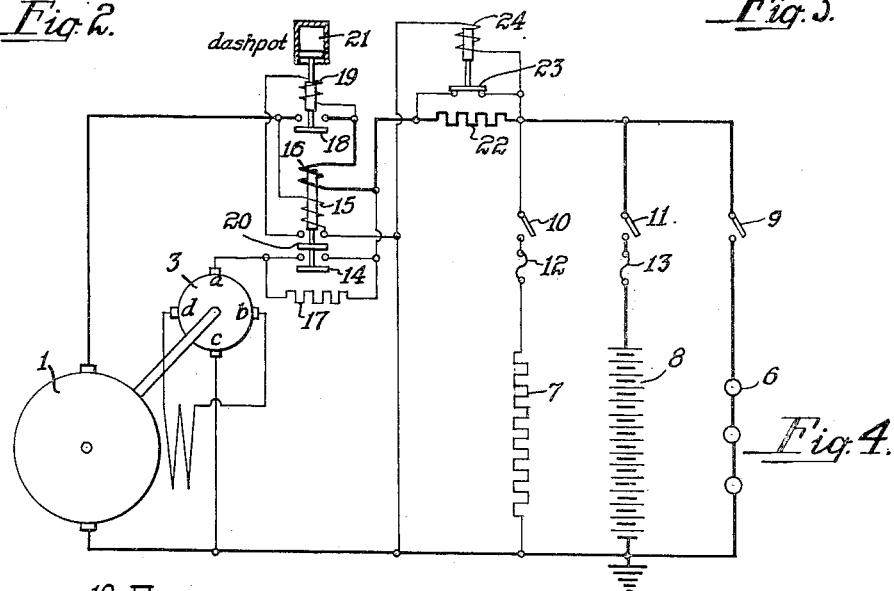
Fig. 4.
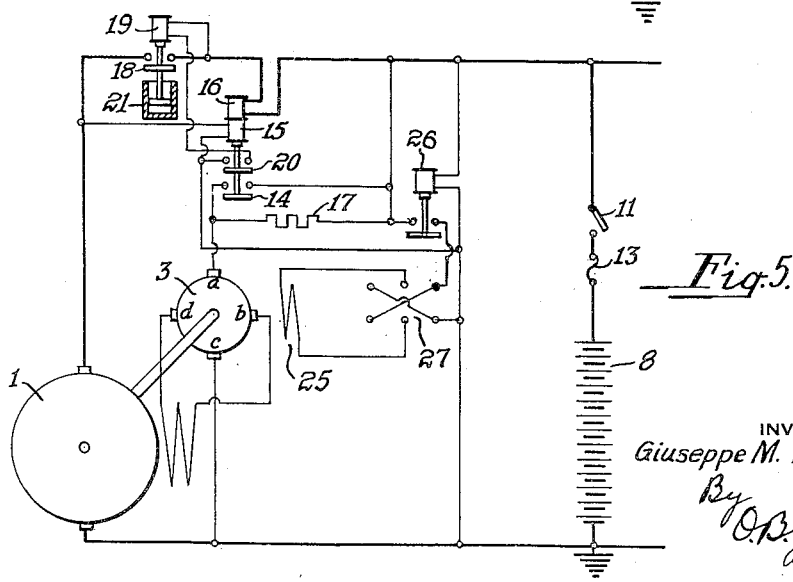
Fig. 5.
INVENTOR
Giuseppe M. Pestarini
By O. B. Buchanan
Attorney INVENTOR
Giuseppe M. Pestarini
By O. B. Buchanan
Attorney Patented Mar. 16, 1937

2,074,236

UNITED STATES PATENT OFFICE 2,074,236

DYNAMO-ELECTRIC GENERATING APPARATUS

Giuseppe Massimo Pestarini, Sheffield, England

Application March 2, 1934, Serial No. 713,628
In Great Britain March 3, 1933

16 Claims. (Cl. 171—313)

This invention relates to dynamo-electric machines, and more particularly to generating apparatus of the kind in which a dynamo-electric generator is driven at a variable speed. The object of the invention is to provide an equipment by means of which a generator of direct current or of alternating current, when driven at a variable speed, can be caused to supply an electromotive force, or polyphase electromotive forces in the case of a polyphase alternating-current generator, which is substantially proportional to a voltage of reference, for example the voltage of an auxiliary direct-current supply. The invention may also provide means for automatically adjusting such proportionality.

An equipment of this description used, for example, for supplying electric energy for lighting, heating or for other purposes on a vehicle or train by means of what are usually called axle-driven generators, may comprise a dynamo-electric machine which is driven from the axle of a vehicle, and a battery which is adapted to be charged by the dynamo and to the supply energy for the lights or other devices when the dynamo-voltage is insufficient for that purpose as, for example, when the train is running below a certain speed or is stopped.

An equipment of this description may also be used for the purpose of generating alternating current by a generator driven by a source of power that may vary in speed, for example a water-turbine, and where it is desired to keep the output-voltage constant independent of the speed of the source of power, in which case the voltage of reference, for example that of an auxiliary source of supply, will be constant.

In an axle-driven generator and exciter equipment, the generator must supply energy to the consumption devices at any speed of the vehicle which exceeds a given minimum and is below a given maximum, in such a way that the voltage of supply will be substantially constant, this being particularly desirable in connection with lighting equipments. The generator must also charge the battery with a suitable current between the same limits of speed, and preferably such charging-current should be reduced to a small value when the battery voltage reaches a certain value, which, for ordinary batteries, is 2.4 volts per cell.

According to the present invention the improved apparatus comprises a dynamo-electric generator, the field winding of which is supplied with current from the secondary circuit of a metadyne which is driven at the same speed as, or at a speed proportional to, that of the generator, the primary winding of the metadyne being supplied from a voltage of reference, for example, an auxiliary source of direct-current supply.

A metadyne is a commutator-type dynamo-electric machine somewhat similar in construction to a direct-current dynamo-electric machine in that it has an armature with windings and a commutator (sometimes more than one commutator) and a stator within which the armature rotates. In the usual and simplest form, two pairs of brush-sets are arranged to make contact with the commutator in quadrature relation to each other, one pair of which form the primary brushes by which current is led into and out of the armature from a source of direct-current supply, the other pair forming the secondary brushes by which the current generated in the armature is led to a consumption or load circuit. The rotor is rotated in the magnetic field due to the currents circulating in the rotor windings. The stator affords a return path of low magnetic reluctance for the flux which is set up by the rotor currents. The stator may be unwound, or it may be provided with various windings, by which magnetic fluxes are set up, which regulate the electrical and mechanical performance of the machine. A winding may be provided on the stator which excites a magnetic flux in the direction of the primary brushes, the effect of which is to reduce the excitation required to be provided by the primary current. In such a machine, energy is supplied to the secondary circuit partly or mainly mechanically through the shaft.

In an equipment according to the present invention, the generator and the metadyne may be arranged to operate at the same points on their respective saturation curves, in which case a very accurate proportionality will be obtained between the electromotive force of the generator and the voltage supplied from the auxiliary source to the primary brushes of the metadyne. If the permeance of the magnetic circuit of the generator and that of the magnetic circuit of the metadyne are chosen so that one machine will reach saturation at a higher speed than the other, the ratio between the electromotive force of the generator and the voltage at the primary brushes of the metadyne will vary according to the speed at which the machines are driven. In some cases the metadyne may be provided with what is known as a variator winding, that is to say, a winding which gives rise to a magnetic field, in the armature of the metadyne, co-axial with that due to the secondary current in said armature. The excitation provided by the variator winding may be arranged to vary with variation of the voltage of the auxiliary source of supply or in accordance with the load on the electric generator or in accordance with both of these quantities, so as to vary the secondary current from the metadyne and thereby vary the excitation of the generator as may be desired.

With the foregoing and other objects in view, my invention consists in the combinations, systems, apparatus and methods hereinafter described and claimed, and illustrated in several different embodiments, by way of example, in the accompanying drawings, wherein Fig. 1 is a diagrammatic view of circuits and apparatus showing the connections of an electric generator excited by a metadyne transformer in accordance with my invention.

Figs. 2 and 3 are curve-diagrams illustrative of the results obtainable by the invention.

Figs. 4 to 10 are views similar to Fig. 1 showing various modified equipments in accordance with the invention.

Figure 6:
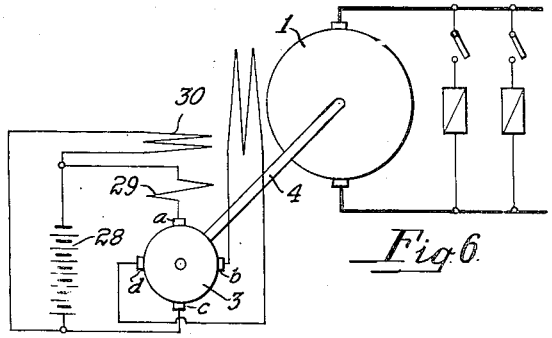

Referring to Fig. 1, an equipment in accordance with the present invention comprises a generator 1 having a field winding 2 which is excited by current from the secondary circuit of a metadyne 3 mounted on the same shaft 4 as the generator. The primary circuit of the metadyne is supplied with current in line with the brushes ac, from an external source such as a direct-current supply-line having a voltage V.

In such an arrangement, the secondary current of the metadyne supplies excitation in line with the secondary brushes db of the metadyne, (which are displaced 90 electrical degrees from the primary brushes ac), to the amount necessary to produce an electromotive force between the primary brushes ac nearly equal to the electromotive force V applied thereto from the external source. The current in the secondary circuit is therefore substantially proportional to the voltage of the external source and inversely proportional to the speed of the shaft. If the secondary magnetic circuit of the metadyne is partially saturated, as will tend to be the case at low speeds, the secondary current will be correspondingly larger.

If the speed of the shaft varies, the excitation supplied to the generator varies in inverse proportion to the speed, so that the voltage U of the generator is maintained substantially proportional to the primary voltage of the metadyne. For values of excitation for which the magnetic circuit of the generator becomes saturated the voltage may still be maintained proportional to the primary voltage if the secondary magnetic circuit of the metadyne becomes saturated in the same proportion at the same time.

Fig. 2 shows the characteristic of such an equipment over a range of speed, the ordinates of this curve being the ratio of the generator voltage U to that of the external source V, and the abscissae representing the speed N of the shaft. At very low speeds the generator is magnetically saturated but the current supplied from the external source is assumed to be limited by resistance or other means, so that the generator voltage at very low speeds is reduced towards zero. In practice, the external source of voltage would usually be disconnected from the metadyne during such operation at very low speeds, as hereafter described.

When the direction of rotation reverses, the direction of the voltage of the generator remains unaltered if the direction of the primary voltage is unaltered so that the ratio of the two voltages remains positive.

Fig. 3 shows other characteristics that may be obtained when the saturation curves of the magnetic circuits of the metadyne and of the generator respectively are not exactly similar and when resistance is present in the primary circuit. Characteristic AB, for example, shows the effect of relatively increasing the saturation of the generator in proportion to that of the metadyne, in which case the relative output voltage U increases with increasing speed. Characteristic AC shows a rise in the relative output voltage U with decreasing speed that may be obtained by relatively greater saturation of the metadyne in proportion to that of the generator. Curve AD shows the result obtained when the saturation of the metadyne increases more rapidly relatively to that of the generator at high speeds and the saturation of the generator relatively more rapidly at low speeds, as the speed is decreased.

Referring now to Fig. 4, a generator 1 excited from the metadyne 3 is shown for supplying current to a circuit comprising lamps 6, heating devices 7 and a battery 8, the usual switches 9, 10, 11 and fuses 12, 13 being provided in the circuits of the various consumption devices as shown. The battery 8 supplies a voltage at the primary brushes a, c of the metadyne. An electromagnetic switch 14 has two magnetizing coils 15, 16 of which the former is connected across the terminals of the generator 1. The other coil 16 is connected in series with the battery on the generator side of the battery. The switch 14 is open when the coils 15, 16 are not excited. The coils 15, 16 are so connected that when current flows from the battery 8 to the generator through coil 16, its magnetic effect opposes that of the current in the coil 15. A resistance 17 is connected between the battery and the primary brush a of the metadyne, and is arranged to be short-circuited when the switch 14 is closed. An electromagnetic disconnect-switch 18 has a magnetizing coil 19 the current for which is supplied through an interlock 20 on the switch 14, and is arranged to connect the battery across the generator terminals when the switch 14 is closed, and is provided with some form of time-lag device, for example a dashpot 21.

In operation, whenever the battery-switch 11 is closed, even with the equipment at rest and the switches 14 and 18 open, a small current is supplied to the primary of the metadyne through the resistance 17, so that some excitation is provided in the primary axis of the metadyne. When the shaft commences to rotate, a voltage is therefore produced at the generator-terminals, and at a predetermined speed the switch 14 is closed by the action of the coil 15, short-circuiting the resistance 17 and increasing the voltage applied to the primary brushes ac of the metadyne to the full value of the battery voltage. This increases the voltage across the generator terminals to the corresponding value nearly equal to, and preferably slightly greater than, that of the battery. The disconnect-switch 18 closes after a short time-lag following the closing of switch 14 and interlock 20.

If the speed of the shaft continues to increase, the battery will continue to be charged. When, however, the speed again falls to some limiting value, the voltage of the generator will fall below that of the battery and the battery will feed a current in the discharging direction through the generator. This will demagnetize the switch 14 by the action of the coil 16, and the opening of the switch 14 will in turn open the disconnect-switch 18 by the action of the interlock 20 in breaking the circuit through the coil 19, so that the metadyne remains connected to the battery only through the resistance 17 which is ready to be automatically short-circuited when the speed next increases to the appropriate lower limiting value.

In order to avoid overcharging of the battery, a resistance 22 is provided in the circuit between the generator and the battery, said resistance being normally short-circuited by an electromagnetic switch 23 operated by a coil 24 connected across the terminals of the battery. When the battery-voltage reaches a certain value corresponding to full charge, for example 2.4 volts per cell, the switch 23 is opened and the charging current is reduced to a small value.

Instead of reducing the charging current by use of a resistance when the battery is fully charged as above described, the metadyne may be provided with what is known as a variator winding 25, as shown in Fig. 5, that is to say, a winding which gives rise to a magnetic field in the armature of the metadyne coaxial with that due to the secondary current in said armature. The variator winding 25 is supplied with energy from the battery 8 and is so connected as to decrease the secondary current of the metadyne and therefore diminish the excitation of the generator. The variator winding is cut in and out of circuit by a relay 26 which is responsive to the voltage of the battery, so as to connect the variator winding 25 in service when the battery is at full charge, and disconnect it at other times. The direction of flow of current in the variator winding must be reversed, however, as by means of a reversing switch 27, when the direction of rotation of the metadyne and generator are reversed.

Referring now to Fig. 6, the source of primary voltage may be a small auxiliary battery indicated at 28. Stator windings indicated at 29 and 30 are provided on the metadyne 3, adapted to excite a magnetic flux having its axis in line with the primary brushes a, c, as indicated, to reduce the output of the battery. By means of said stator windings, the primary current will be reduced and the metadyne 3 will on the average obtain the energy necessary for current in the secondary circuit mainly or entirely from the shaft 4, the battery being maintained floating in the primary circuit.

Figure 7:
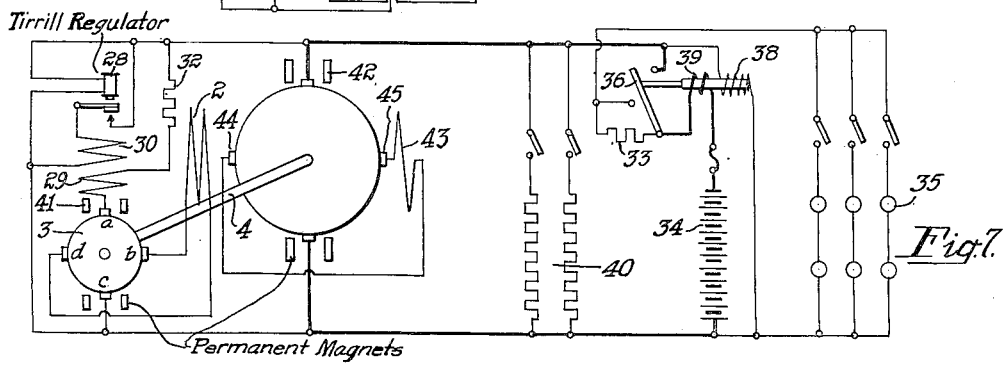

Fig. 7 shows an equipment in which the current in the stator winding 30 in the primary armature-field axis of the metadyne is regulated by a regulator such, for example, as a Tirrill regulator 28 sensitive to the voltage produced by the main generator 1. A resistance 32 is provided in series with the primary brushes a, c, of the metadyne, the voltage-drop of which reduces the voltage applied to said brushes. The effect of the regulator 28 is to cut the winding 30 in and out, and consequently to vary the ampere-turns in the primary axis of the metadyne. This variation in the ampere-turns results in a variation of the primary current and therefore of the voltage-drop in the resistance 32. This effects a corresponding variation in the secondary current of the metadyne, which accordingly varies the excitation of the generator in such a manner as to maintain the terminal voltage substantially constant.

In addition to the winding 30 on the stator of the metadyne a winding 29, similar to the winding 29 of Fig. 6, included in the primary circuit of the metadyne 3, may be employed, as indicated in Fig. 7.

Fig. 7 also shows a further improvement consisting in a resistance 33 which is inserted between the main battery 34 and the lamps 35 when the battery-switch 36 is closed or moved to the right, said resistance 33 being short-circuited when the battery-switch 36 is opened or moved to the left so that the generator 1 is disconnected from the battery 34. In the first case the battery 34 is being charged, and the charging-voltage being high, the resistance 33 is connected in series with the lamps, to provide for a convenient ohmic drop between the battery and the lamps 35; in the second case the battery 34 is discharging, and has a lower voltage which is wholly impressed on the lamps 35, the resistance 33 being short-circuited by a back-contact on the battery-switch 36. Thus the lamps will have practically the same voltage on their filaments in both cases. The battery-switch 36 is actuated by an electromagnet energized by the coils 38, 39 of which the former is connected across the terminals of the generator 1 and the latter between the generator and the battery. When the battery is being charged, the battery-switch 36 will be closed or moved to the right by the action of the coil 38, and the ampere-turns in the coil 39 will assist the ampere-turns in the coil 38, but if the battery-voltage rises relatively to the generator-voltage, so that the battery begins to discharge, the current flowing in the coil 39 oppose that flowing in the coil 38, and the battery-switch 36 is released so that it opens or moves towards the left so as to break the charging circuit and short-circuit the resistance 33 as before described. Consuming devices other than lamps, that need not be supplied when the speed is low, may be connected as indicated at 40 between the generator 1 and the battery-switch 36.

Fig. 7 also shows an improvement consisting in the provision of permanent-magnet elements 41 in the primary-brush circuit of the metadyne 3, or permanent-magnet elements 42 in the main brush-axis of the generator 1, or both. The permanent magnets 41 serve to provide initial magnetism in the primary axis of the metadyne 3, so that when running at low speed a certain amount of voltage will be produced at the terminals of the generator 1, which will cause the coil 38 to operate the electromagnetic battery-switch 36 as soon as a predetermined speed is reached. This arrangement enables the simpler form of battery-switch 36 shown in Fig. 7 to be employed instead of the more complicated form such as shown at 14—18 in Fig. 4, which would otherwise be necessary.

If the permanent-magnet elements 42 are utilized, in the main brush-axis of the generator, as indicated in Fig. 7, it is necessary to provide an auxiliary field-winding, shown at 43, connected between a pair of auxiliary brushes 44 and 45 in quadrature relation to the main brushes on the generator, so that this permanent magnetism will induce a current in the winding 43 and so provide the desired initial excitation of the generator. As soon as the generator starts to deliver current, its armature-reaction sets up a field in the main brush-axis, which supplements or augments the field due to the permanent magnets 42. The auxiliary winding 43 thus has the further advantage that it provides a compounding effect on the generator, which tends to increase the voltage of the generator as the current supplied by it increases, thus offsetting the drop due to resistance and armature reaction. This type of compounding has the advantage that it is not necessary to reverse the compounding coil 46 when the direction of rotation is reversed.

Figure 8:
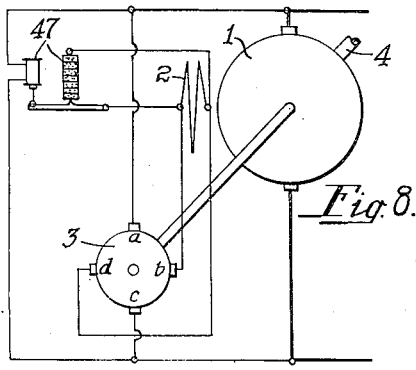

Fig. 8 shows an alternative to the scheme of Fig. 7. The vibrating regulator device is replaced by a carbon-pile or any other regulator device 47 which is so constructed as to be sensitive to the generator-voltage and which shunts the field excitation-coil 2 of the main generator more or less, so as to maintain the generator-voltage substantially constant.

Figure 9:
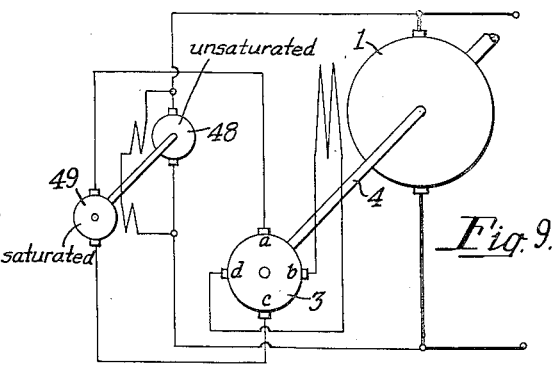

Fig. 9 shows an alternative to the scheme of Fig. 7 for feeding the primary brushes a c of the metadyne 3. A small motor-generator set comprises two small dynamo-electric machines 48 and 49. One machine 48 is unsaturated, shunt excited and directly fed by the voltage induced in the main generator 1. The other machine 49 has a very saturated magnetic circuit excited by the same source as the first machine 48. As the machine 48 is unsaturated, it will drive the set at practically constant speed, even when the voltage across the generator 1 varies considerably. The dynamo 49, being driven at constant speed, will produce a constant voltage if its flux is constant, which is ensured by the saturation of its magnetic circuit even though the exciting ampere-turns may vary to some extent. The substantially constant voltage produced by the saturated dynamo 49 supplies the primary brushes of the metadyne 3.

Figure 10:
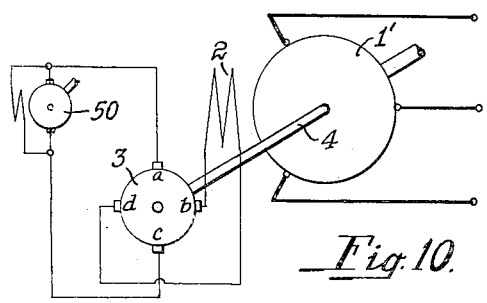

Fig. 10 shows another alternative auxiliary source for feeding the primary brushes of the metadyne, particularly suitable for application in the case of water-power plants. A small turbine or any other prime mover (not shown) drives an auxiliary dynamo 50. Usually this small prime mover, for instance a water-turbine, has no governor, but its speed is constant, even for loads that vary between reasonable limits, because its friction losses are very large and represent practically the whole amount of mechanical energy supplied. The dynamo 50 then feeds the primary brushes a c of the metadyne 3 with constant voltage and in its turn the metadyne feeds the field excitation-coil 2 of the main generator 1', which in this case is illustrated as an alternator. The secondary brushes b, d of the metadyne furnish a voltage which varies substantially inversely with the speed, so that a constant output-voltage is obtained from the alternator 1' independently of its speed.

While I have shown my invention in several specific forms of embodiment, I desire it to be understood that these are only illustrative, as my invention, in its broadest aspects, is by no means limited thereto, and many changes and adaptations may be resorted to, as will be obvious to those skilled in the art, in the light of the foregoing descriptions and explanations. I desire, therefore, that the appended claims shall be accorded the broadest construction consistent with their language and the prior art.

I claim as my invention:

1. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, at least one of the dynamo-electric machines being provided with a permanent magnet which is arranged to induce an electromotive force at the terminals of the generator.

2. In combination, a main dynamo-electric machine adapted to operate as a direct-current generator at a variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, at least one of the dynamo-electric machines being provided with a permanent magnet which is arranged to induce an electromotive force at the terminals of the generator.

3. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and means for deriving a voltage from the main dynamo-electric machine for feeding the primary brush-circuit of said metadyne, in combination with regulator-means sensitive to the main machine voltage for modifying the primary current of the metadyne during normal operation thereof.

4. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, said direct-current voltage-circuit comprising a motor-generator set consisting of a substantially constant-speed dynamo-electric machine fed by the main dynamo-electric machine voltage, and a saturated direct-current generator which supplies a substantially constant voltage to the primary brushes of the metadyne.

5. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, said direct-current voltage-circuit comprising a dynamo having a substantially saturated magnetic circuit, means for exciting said dynamo substantially proportionately to the terminal voltage of the main machine, an auxiliary motor connected in driving relation to said dynamo, and means for energizing said auxiliary motor substantially proportionately to the terminal voltage of the main machine, said auxiliary motor being of a type operating at a substantially constant speed in spite of variations in its energizing voltage within the operating limits of the combination.

6. In combination, a main dynamo-electric machine adapted to operate as a direct-current generator at a variable speed, an independent source of substantially constant direct-current voltage, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, means for feeding the primary brush circuit of said metadyne from said independent source, said primary brush circuit of the metadyne including an external resistor in series circuit relation therein, and electromagnetic switching means responsive to a rise in generator-voltage to a predetermined value for first short-circuiting said resistor and then making a circuit connection between said generator and said independent source, said electromagnetic switching means being responsive also to the current interchanged between said generator and said independent source in such manner as to operate, upon a falling off of the generator-voltage, to return to its initial siwtching position whereby the resistor is in circuit in said primary brush circuit and there is a break in the circuit connection between said generator and said independent source.

7. In combination, a main dynamo-electric machine adapted to operate at variable speed, a metadyne compriisng a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and means for feeding the primary brush circuit of the metadyne at all times from the terminals of the main dynamo-electric machine, at least one of the dynamo-electric machines being provided, at all times, with flux-producing means, in addition to the last-mentioned means, and independent of the voltage at the terminals of the main dynamo-electric machine, to produce a flux in a predetermined axis whereby an electromotive force is induced at the terminals of the main dynamo-electric machine when said machine is rotated.

8. In combination, a main commutator-type dynamo-electric machine having a set of main brushes and a set of auxiliary brushes in substantially quadrature relation to the main brushes, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having a stationary field frame member including a main exciting field winding and an auxiliary exciting field winding both producing flux in the axis of the auxiliary brushes, and other flux-producing means for producing flux in the axis of the primary brushes independently of the speed of the main dynamo-electric machine, means including the secondary brush circuit of said metadyne for energizing said main exciting field winding, means including the auxiliary brush circuit of the main machine for energizing said auxiliary exciting field winding, and a direct-current voltage-circuit for feeding the primary brush circuit of said metadyne.

9. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit including a storage-battery for feeding the primary brush circuit of said metadyne, said metadyne having a shunt field coil and a series field coil both producing such excitation in the axis of the primary brushes as to reduce the energy supplied by the direct-current voltage-circuit and to cause the product of speed and secondary current of the metadyne to be substantially constantly proportioned to the primary voltage over a predetermined range of normal operation.

10. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit including a storage-battery for feeding the primary brush circuit of said metadyne, said metadyne having means including a shunt field coil producing such excitation in the axis of the primary brushes as to reduce the energy supplied by the direct-current voltage-circuit and to cause the product of speed and secondary current of the metadyne to be substantially constantly proportioned to the primary voltage over a predetermined range of normal operation.

11. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, said metadyne having means including a shunt field coil producing such excitation in the axis of the primary brushes as to reduce the energy supplied by the direct-current voltage-circuit and to cause the product of speed and secondary current of the metadyne to be substantially constantly proportioned to the primary voltage over a predetermined range of normal operation.

12. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, a direct-current voltage-circuit for feeding the primary brush circuit of said metadyne, said metadyne being provided with stator windings having their magnetic axis in the direction of the primary commutation axis, circuit-means for energizing said stator windings of the metadyne, and regulator-means sensitive to the main machine voltage for modifying the energizing-current in stator windings of the metadyne.

13. In combination, a main dynamo-electric machine adapted to operate at variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, a direct-current voltage-circuit for feeding the primary brush circuit of said metadyne, and regulator-means sensitive to the main machine voltage for effecting a modification in the relation between the voltage of said direct-current voltage-circuit and the product of speed times the current in the exciting field winding of the main machine.

14. In combination, a main dynamo-electric machine adapted to operate as a direct-current generator at a variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, said direct-current voltage-circuit comprising a motor-generator set consisting of a substantially unsaturated, shunt direct-current motor fed by the main dynamo-electric machine voltage, and a direct-current generator which supplies a substantially constant voltage to the primary brushes of the metadyne.

15. In combination, a main dynamo-electric machine adapted to operate as a direct-current generator at a variable speed, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and a direct-current voltage-circuit for feeding the primary brush circuit of said metadyne, said direct-current voltage-circuit comprising a saturated direct-current generator which supplies a substantially constant voltage to the primary brushes of the metadyne.

16. In combination, a storage battery, a direct-current load-circuit therefor, a main dynamo-electric machine adapted to operate as a direct-current generator at a variable speed, said generator having a single main output-circuit, switching means, responsive to the voltage of said single main output-circuit and to the current flowing between said single main output-circuit and said battery and load-circuit, for causing said single main output-circuit to be connected to both said battery and said load-circuit when the voltage of said single main output-circuit attains a predetermined value, and for causing said connection to be broken at other times, a metadyne comprising a commutator-type dynamo-electric machine having a set of primary brushes and a set of secondary brushes in substantially quadrature relation to the primary brushes, means for causing the metadyne to rotate at a speed having substantially a predetermined relation to the speed of the main dynamo-electric machine, said main machine having an exciting field winding, means including the secondary brush circuit of said metadyne for energizing said exciting field winding, and feeding-circuit means operative, when the generator has attained a predetermined speed, to apply such a direct-current voltage to the primary brushes of the metadyne so as to mainain a predetermined substantially constant value of the product of speed times the current in the exciting field winding of the generator, said feeding-circuit means being operative, at other times, to apply a smaller direct-current voltage to the primary brushes of the metadyne, so as to maintain a lower value of the product of speed times the current in the exciting field winding of the generator.

GIUSEPPE M. PESTARINI.